(12) United States Patent
Im et al.

(10) Patent No.: US 11,248,331 B2
(45) Date of Patent: Feb. 15, 2022

(54) APPARATUS FOR TREATING LAUNDRY HAVING A PLURALITY OF BENT PORTIONS AND CONTROLLING METHOD THEREOF

(71) Applicant: LG Electronics Inc., Seoul (KR)

(72) Inventors: Myunghun Im, Seoul (KR); Jaehyun Kim, Seoul (KR); Kyungchul Woo, Seoul (KR); Hwanjin Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 74 days.

(21) Appl. No.: 16/184,232

(22) Filed: Nov. 8, 2018

(65) Prior Publication Data

US 2019/0136436 A1    May 9, 2019

(30) Foreign Application Priority Data

Nov. 8, 2017  (KR) .......................... 10-2017-0148240

(51) Int. Cl.
*D06F 33/00* (2020.01)
*D06F 37/02* (2006.01)
(Continued)

(52) U.S. Cl.
CPC ............ *D06F 37/304* (2013.01); *D06F 21/04* (2013.01); *D06F 33/36* (2020.02); *D06F 37/06* (2013.01); *D06F 2101/20* (2020.02); *D06F 2103/04* (2020.02); *D06F 2103/38* (2020.02); *D06F 2105/46* (2020.02); *D06F 2105/48* (2020.02);
(Continued)

(58) Field of Classification Search
CPC ........ D06F 34/18; D06F 37/06; D06F 37/065; D06F 33/00
See application file for complete search history.

(56) References Cited

U.S. PATENT DOCUMENTS 3,388,410 A * 6/1968 Marshall ............... D06F 35/006
                                                    8/158
5,115,651 A * 5/1992 Nukaga .................... D06F 25/00
                                                    210/363
(Continued)

FOREIGN PATENT DOCUMENTS

| DE | 10227957 A1 * | 1/2004 | .......... D06F 37/065 |
| WO | WO2011019197 | 2/2011 | |

OTHER PUBLICATIONS

European Extended Search Report in European Application No. 18204872, dated Mar. 19, 2019, 8 pages.

*Primary Examiner* — Joseph L. Perrin
*Assistant Examiner* — Irina Graf
(74) *Attorney, Agent, or Firm* — Fish & Richardson P.C.

(57) ABSTRACT

A laundry treating apparatus includes a cabinet, a tub provided inside the cabinet, a drum rotatably provided inside the tub to accommodate laundry, a motor directly connected to a rotation shaft of the drum, and a controller configured to control the driving of the motor according to any one of a plurality of preset drum driving motions. The controller controls the rotation of the motor to receive a physical force greater than a static frictional force acting between the laundry and the drum from an inner surface of the drum during a process in which the laundry falls to be in contact with a portion of the drum when a first motion of the plurality of drum driving motions is selected.

18 Claims, 10 Drawing Sheets

(51) Int. Cl.
  *D06F 23/02* (2006.01)
  *D06F 37/36* (2006.01)
  *D06F 37/30* (2020.01)
  *D06F 21/04* (2006.01)
  *D06F 37/06* (2006.01)
  *D06F 103/04* (2020.01)
  *D06F 103/38* (2020.01)
  *D06F 105/46* (2020.01)
  *D06F 105/48* (2020.01)
  *D06F 105/52* (2020.01)
  *D06F 105/58* (2020.01)
  *D06F 101/20* (2020.01)
  *D06F 33/36* (2020.01)

(52) U.S. Cl.
  CPC ...... *D06F 2105/52* (2020.02); *D06F 2105/58* (2020.02)

(56) References Cited

U.S. PATENT DOCUMENTS

| | | | |
|---|---|---|---|
| 8,533,882 B2 * | 9/2013 | Lilie | D06F 37/203 68/12.01 |
| 2005/0022565 A1 * | 2/2005 | Jung | D06F 37/06 68/24 |
| 2005/0066999 A1 * | 3/2005 | Dietz | D06F 35/006 134/18 |
| 2005/0097927 A1 * | 5/2005 | Kim | D06F 23/06 68/24 |
| 2005/0268669 A1 * | 12/2005 | Ko | D06F 37/302 68/12.05 |
| 2007/0157677 A1 * | 7/2007 | Tatsumi | D06F 37/06 68/142 |
| 2010/0287996 A1 * | 11/2010 | Geyer | D06F 58/02 68/139 |
| 2011/0100068 A1 * | 5/2011 | Simsek | D06F 37/06 68/19 |
| 2011/0113569 A1 * | 5/2011 | Ashrafzadeh | D06F 23/025 8/159 |
| 2011/0132415 A1 * | 6/2011 | Hashimoto | D06F 39/088 134/184 |
| 2012/0017380 A1 * | 1/2012 | Kim | D06F 35/006 8/137 |
| 2012/0174631 A1 | 7/2012 | Cho et al. | |
| 2014/0201929 A1 * | 7/2014 | He | D06F 35/006 8/137 |
| 2015/0176172 A1 * | 6/2015 | Kim | D06F 37/04 68/140 |

\* cited by examiner

APPARATUS FOR TREATING LAUNDRY HAVING A PLURALITY OF BENT PORTIONS AND CONTROLLING METHOD THEREOF

CROSS-REFERENCE TO RELATED APPLICATIONS

The present disclosure relates to subject matter contained in priority Korean Application No. 10-2017-0148240, filed on Nov. 8, 2017, which is herein expressly incorporated by reference in its entirety.

BACKGROUND OF THE INVENTION

1. Field of the Invention

The present disclosure relates to a laundry treating apparatus provided with a drum to wash, dry or dehydrate clothes, and a control method thereof.

2. Description of the Conventional Art

The laundry treating apparatus may be divided into a top loading type and a front loading type depending on a clothes loading method.

The top loading type laundry treating apparatus includes a cabinet forming an outer appearance, a tub provided inside the cabinet to provide a space for accommodating clothes, and an inlet port provided on an upper surface of the cabinet to communicate with the tub.

The front loading type laundry treating apparatus includes a cabinet forming an outer appearance, a tub provided inside the cabinet to provide a space for accommodating clothes, and an inlet port provided on a front surface of the cabinet to communicate with the tub.

Such a front loading type laundry treating apparatus includes a drum in which laundry is accommodated inside the tub, and a motor and a shaft for rotating the drum on a rear surface of the tub. Therefore, the front loading type laundry treating apparatus is generally called a drum type washing machine.

The front loading type laundry treating apparatus having the foregoing configuration removes dirt contained in laundry by wash water stored in the tub, a frictional force generated between the laundry stored in the drum and an inner surface of the drum, and the chemical action of detergent stored in washing water.

Taking such a washing principle into consideration, the rotation pattern of the drum is a main variable of the washing performance of the laundry treating apparatus. Here, the rotation pattern of the drum may denote a change aspect of at least one of the rotational direction and the rotational speed of the drum.

Furthermore, as an inner shape of the drum changes, the washing performance of the laundry treating apparatus may change even when the rotation pattern of the drum is maintained the same.

In general, an inner circumferential surface of the drum is provided with a lifter for helping washing laundry while rotating the drum, by rising and falling of laundry. The lifter is a device for assisting washing of laundry while lifting the laundry upward and then dropping the laundry as the drum rotates after detergent, wash water and the laundry are put into the drum.

The lifter is attached to an inner circumferential surface of the drum to receive water in an inner space of the lifter and then inject water to laundry in the drum so as to prevent the laundry from being damaged, partially reduce water usage, and obtain an effect of washing by pounding, rubbing and washing laundry accommodated in the drum.

Since the lifter must be coupled to the drum through an additional fastening member, and an additional manufacturing process for additionally fastening the lifter to the drum is required, the performance deterioration of the lifter may be caused due to a defect or failure of the fastening member, and water flowing into the lifter may be discharged through a fastening portion between the drum and the lifter, thereby resulting in unnecessary drainage of wash water.

Therefore, the development of a structure in which water accommodated in the lifter is not allowed to flow out through a coupling portion between the drum and the lifter without causing the performance deterioration of the lifter due to the combination of the drum and the lifter is required.

As described above, when an inner shape of the drum is changed, the development of the rotation pattern of the drum optimized for the changed shape will be also required.

SUMMARY OF THE INVENTION

A technical problem to be solved by the present disclosure provides a laundry treating apparatus capable of implementing an operation of a person rubbing laundry on a washboard and a control method thereof.

Furthermore, an object of the present disclosure is to provide a laundry treating apparatus for setting a rotation pattern of a drum to receive a strong physical force repeatedly from the drum and a control method thereof.

In addition, another object of the present disclosure is to provide a laundry treating apparatus capable of maximizing a relative speed between laundry and a drum when the laundry and the drum collide with each other and a control method thereof.

These objects and problems are among those solved and achieved by the subject-matter of the independent claims. The dependent claims relate to further aspects of the invention.

In order to accomplish the object of the present disclosure, a laundry treating apparatus according to an embodiment of the present disclosure may include a cabinet, a tub provided inside the cabinet, a drum rotatably provided inside the tub to accommodate laundry, a motor directly connected to a rotation shaft of the drum, and a controller configured to control the driving of the motor according to any one of a plurality of preset drum driving motions, wherein the controller controls the rotation of the motor to receive a physical force greater than a static frictional force acting between the laundry and the drum from an inner surface of the drum during a process in which the laundry falls to be in contact with a portion of the drum when a first motion of the plurality of drum driving motions is selected.

According to an embodiment, the controller may increase the rotational speed of the motor at a first acceleration for a first time interval and decrease the rotational speed of the motor at a second acceleration for a second time interval when the first motion is started.

According to an embodiment, the controller may set an absolute value of the first acceleration to be smaller than that of the second acceleration.

According to an embodiment, the controller may repeatedly perform the process of increasing and decreasing the rotational speed of the motor by a predetermined number of times.

According to an embodiment, the controller may stop the driving of the motor for a preset time interval when the process of increasing and decreasing the rotational speed of the motor is repeated the predetermined number of times.

According to an embodiment, the motor may be in a stopped state at a time point when the process of decreasing the rotational speed of the motor at a second acceleration is completed.

According to an embodiment, the laundry treating apparatus may further include a sensor configured to sense the weight of the laundry, wherein the controller changes the driving pattern of the motor corresponding to the first motion based on the weight sensed by the sensor.

According to an embodiment, the controller may change at least one of the first and second accelerations or change at least one of the first and second time intervals based on the weight sensed by the sensor.

According to an embodiment, the controller may perform reverse phase braking on the motor to decrease the rotational speed of the motor.

According to an embodiment, the controller may increase the rotational speed of the motor at the first acceleration from a time point when the laundry falls to be in contact with a portion of the drum to increase a physical force received from an inner circumferential surface of the drum.

According to an embodiment, the controller may control the motor such that the laundry is separated from the drum at a predetermined angular position with respect to the rotational direction of the drum to fall to the lowest point of the drum.

According to an embodiment, the controller may control the motor such that a torque acting in a direction opposite to the advancing direction of the laundry is applied to the drum when the laundry reaches a predetermined angular position.

According to an embodiment, the controller may control the motor such that a physical force greater than a static frictional force acting between the drum and the laundry is received a plural number of times from an inner surface of the drum while the laundry is moved from the lowest point of the drum to the predetermined angular position.

According to an embodiment, the drum may have at least one bent portion protruded from an inner circumferential surface of the drum and formed along a direction of extending the drum, and each of the bent portions may be arranged at regular intervals on an inner surface of the drum.

According to an embodiment, the bent portion of the drum may be integrally formed to extend from an entrance side of the drum to a bottom portion side of the drum. According to an embodiment, the bent portion may include a first bent portion formed on an inner surface of the entrance side of the drum, and a second bent portion spaced apart from the first bent portion by a predetermined length toward the bottom portion side of the drum and formed on the bottom portion side of the drum.

According to an embodiment, the first bent portion and the second bent portion may be formed along different imaginary lines extended from the entrance side of the drum toward the bottom portion side, and arranged in a shape of intersecting with each other.

According to an embodiment, each of the bent portions may be formed to have a predetermined curvature from the entrance side of the drum toward the bottom portion side.

According to an embodiment, a plurality of protrusions may be formed at regular intervals on a surface of the bent portion.

According to an embodiment, the bent portion may be formed in a tapered shape toward an inside of the drum.

According to an embodiment, the bent portion may be configured to have a predetermined height, and an upper end portion of the bent portion may be configured to have a circular shape having a predetermined curvature.

According to an embodiment, the bent portion may be formed to be recessed toward an inside of the drum on an outer surface of the drum.

According to an embodiment, the bent portion may be formed integrally with the drum.

According to an embodiment, each of the bent portions may be formed with a plurality of through holes formed to allow the flowing-in and flowing-out of wash water.

According to an embodiment, each of the bent portions may be formed to have a lower height toward an entrance side and a bottom portion side of the drum.

The laundry treating apparatus according to the present disclosure may perform a drum driving motion optimized for a drum including a bent portion and a shape of the drum, thereby implementing a principle of rubbing and washing laundry on a washboard.

Furthermore, a mechanical force received by laundry may be maximized by a shape of a drum included in the clothes processing apparatus according to the present invention and a drum driving motion optimized for the shape, thereby enhancing the washing performance.

In addition, according to the laundry treating apparatus of the present disclosure, a physical force acting between laundry and a drum in the drum may be maximized, thereby enhancing the cleaning power.

Besides, according to the laundry treating apparatus of the present disclosure, a bent portion integrally formed with a drum, thereby preventing a failure, which may be caused by a fastening structure of the drum and the lifter, in advance.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, the embodiments disclosed herein will be described in detail with reference to the accompanying drawings, and it should be noted that technological terms used herein are merely used to describe a specific embodiment, but not to limit the present invention. Also, unless particularly defined otherwise, technological terms used herein should be construed as a meaning that is generally understood by those having ordinary skill in the art disclosed in the present specification, and should not be construed too broadly or too narrowly.

An embodiment of the laundry treating apparatus will be described with reference to FIG. 1.

Figure 1:
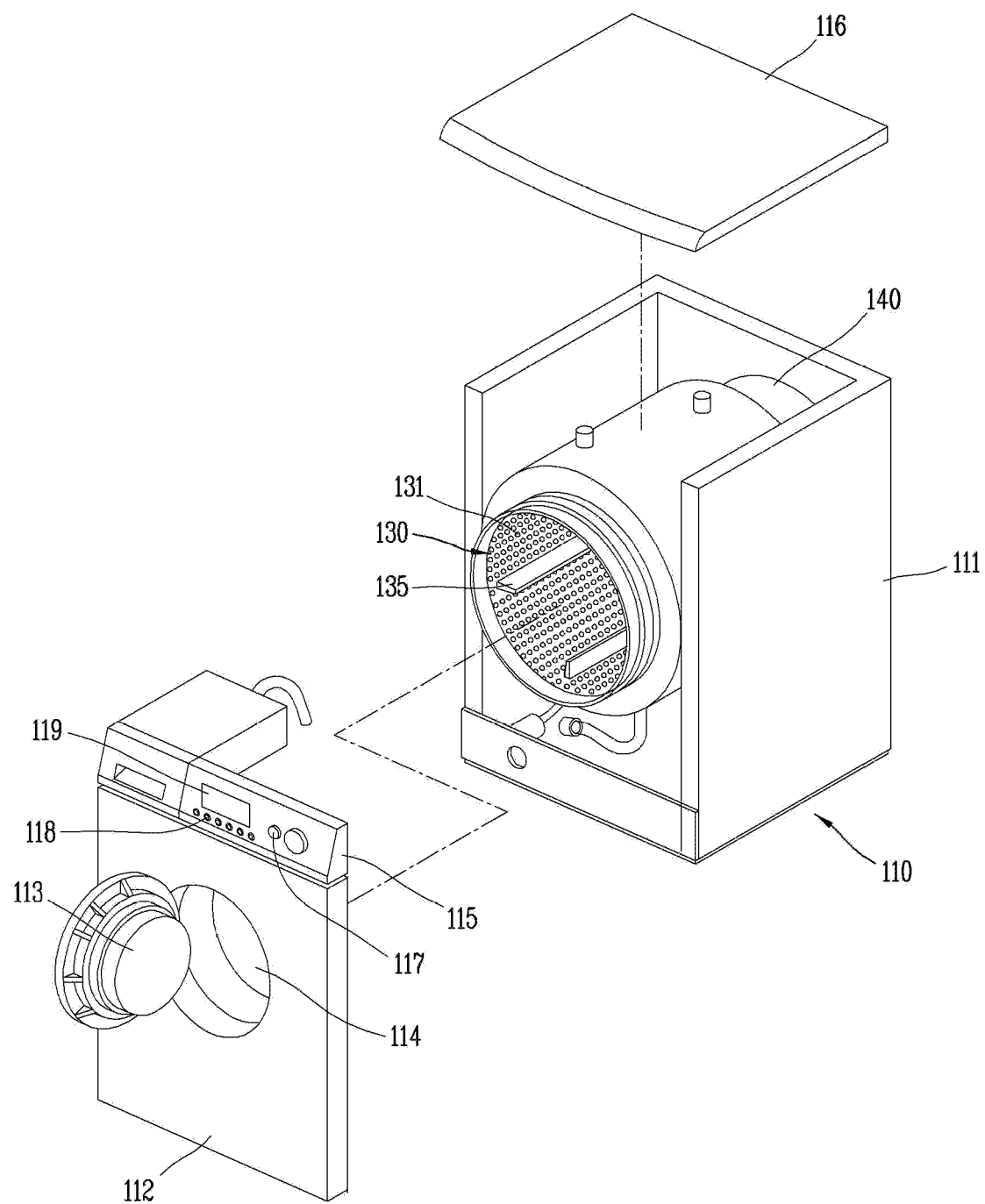
FIG. 1 is a conceptual view illustrating a typical laundry treating apparatus.

Referring to FIG. 1, the laundry treating apparatus includes a cabinet 110 forming an outer appearance, a tub 120 provided inside the cabinet and supported by the cabinet, a drum 130 rotatably provided inside the tub to load laundry therein, a motor 140 for applying a torque to the drum to rotate the drum, and a control panel 115 for receiving a selection of an operation mode of the laundry treating apparatus from a user or receiving an input related to the execution of the selected operation mode.

The cabinet 110 includes a main body 111, a cover 112 provided on a front surface of the main body and coupled thereto, and a top plate 116 coupled to an upper portion of the main body. The cover 112 may include an opening portion 114 provided to allow access to laundry, and a door 113 that selectively opens and closes the opening portion.

The drum 130 forms a space for washing laundry loaded therein. The drum 130 is rotated by receiving power from the motor 140. Since the drum 130 has a plurality of through holes 131, wash water stored in the tub 120 may flow into the drum 130 through the through holes 131, and the wash water inside the drum may flow out to the tub. Therefore, when the drum rotates, dirt is removed from the laundry loaded into the drum while rubbing against wash water stored in the tub.

The control panel 115 may receive an input related to the operation of the laundry treating apparatus from a user. At the same time, the control panel 115 may be provided with a display to output information related to an operation state of the laundry treating apparatus.

In other words, the control panel 115 may implement an interface with a user.

Specifically, the control panel 115 includes manipulation units 117, 118 allowing a user to input a control command, and a display unit 119 that displays control information according to the control command. Furthermore, the control panel may include a controller (not shown) that controls the driving of the laundry treating apparatus including the operation of the motor according to the control command.

According to a control method of the washing machine of the present disclosure, the drum may be driven in various forms. In other words, drum driving is carried out in more various forms as well as typical tumble driving and spin driving. The tumble driving is a drum driving motion in which laundry is lifted and then dropped during washing or rinsing in a typical drum washing machine, and the spin driving is a drum driving motion in which laundry continues to rotate while being attached to the inside of the drum during dehydration.

The drum driving motion in the present disclosure denotes a rpm at which the drum rotates, as well as a motion in which laundry flows in the drum in association therewith. Therefore, the present disclosure provides a laundry treating apparatus for controlling a motor with the rotation of a drum for driving the drum in various drum driving motions, particularly, a rotation pattern of the drum corresponding to a selected drum driving motion, and a control method thereof.

Figure 2:
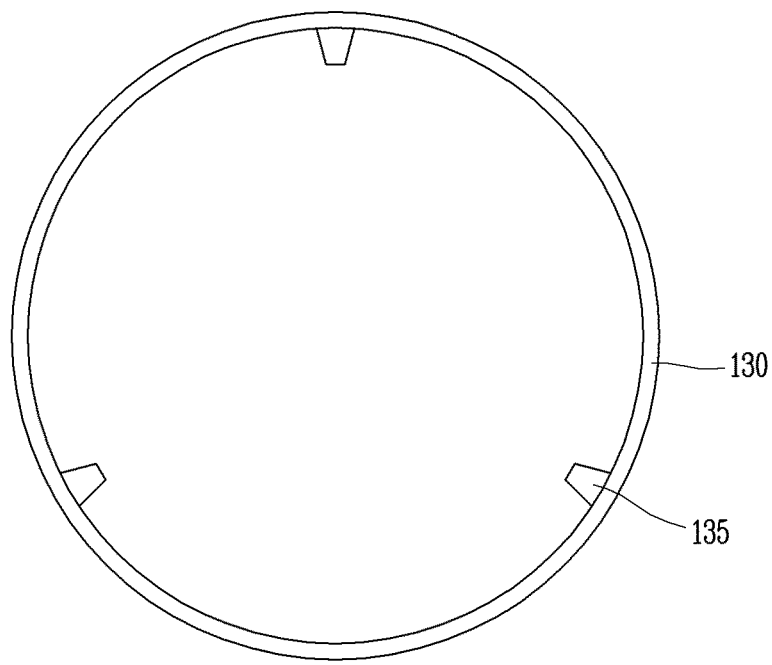
FIG. 2 is a longitudinal sectional view of a drum provided in a typical laundry treating apparatus.

FIG. 2 is a longitudinal sectional view of the drum 130 provided in a typical laundry treating apparatus.

Referring to FIG. 2, a plurality of lifters 135 are typically provided on an inner circumferential surface of the drum 130.

In one embodiment, an inner circumferential surface of the drum 130 is coupled to three lifters 135, and the three lifters 135 may be disposed at substantially equal intervals from each other.

As described above, such a lifter 135 must be coupled to the drum through a separate fastening member, and requires a separate manufacturing process for fastening the lifter to the drum separately during the coupling process.

Therefore, the performance deterioration of the lifter may be caused due to a defect or failure of the fastening member, and water flowing into the lifter may be discharged through a fastening portion between the drum and the lifter, thereby causing unnecessary drainage of wash water.

In addition, the lifter 135 in the related art is formed to hang laundry while the drum is rotating, and thus installed for the purpose of lifting the laundry to an upper portion of the drum. In consideration of the purpose, the lifter 135 in the related art is formed to have a height and a width enough to effectively lift laundry, and taking the standard of the lifter into consideration, there is a problem that three or more lifters are difficult to be arranged in the drum.

On the other hand, in addition to the above-mentioned problems, as a method for enhancing the washing performance of the laundry treating apparatus, the present disclosure implements a washboard shape having a plurality of bends and a principle of rubbing and washing laundry on the washboard shape.

In order to implement such a principle, the development of a drum driving motion capable of producing an effect similar to a behavior of rubbing laundry on a washboard, as well as forming an inner circumferential surface of the drum similarly to a washboard shape is required.

In view of such recognition, the present disclosure proposes a drum shape having a plurality of bent portions on the inner circumferential surface and a drum driving motion capable of maximizing a force acting between the laundry and the inner circumferential surface of the drum using the drum shape.

Hereinafter, an embodiment of the drum 130 according to the present disclosure will be described with reference to FIG. 3.

Figure 3:
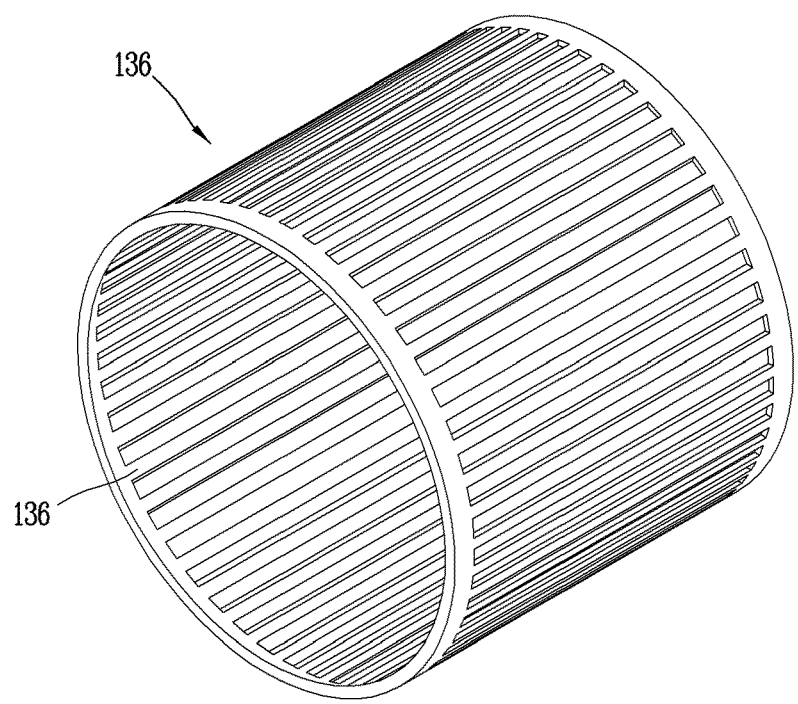
FIG. 3 is a conceptual view illustrating a shape of a drum according to the present disclosure.

Referring to FIG. 3, the drum 130 according to the present disclosure may be provided with at least one bent portion 136 protruded from an inner circumferential surface of the drum and formed along a direction of extending the drum.

For example, each of the bent portions 136 may be disposed at substantially regular intervals on the inner circumferential surface of the drum 130.

In addition, the bent portion 136 may be integrally formed in an extending manner from an entrance side of the drum 130 to a bottom portion side of the drum.

Moreover, the bent portion 136 may be formed to have a predetermined curvature toward the bottom portion side from the entrance side of the drum 130.

Figure 4:
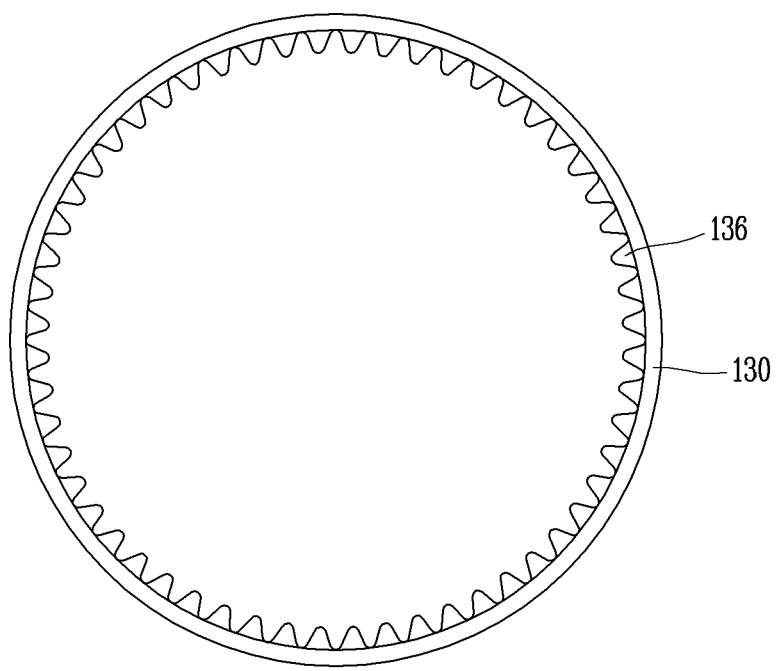
FIG. 4 is a longitudinal sectional view of a drum according to the present disclosure.

FIG. 4 is a longitudinal sectional view of the drum 130 according to the present disclosure.

Referring to FIG. 4, a plurality of bent portions 136 may be arranged on an inner circumferential surface of the drum 130 at predetermined intervals. A spacing between different bent portions 136 may vary depending on the design.

On the other hand, FIG. 4 illustrates a line between the bent portion 136 and the drum 130 in order to emphasize a point where the bent portion 136 is protruded from an inner circumferential surface of the drum 130, but the bent portion 136 may also be formed integrally with the drum 130. The integral formation of the bent portion 136 and the drum 130 will be described below in more detail in FIG. 5.

Figure 5:
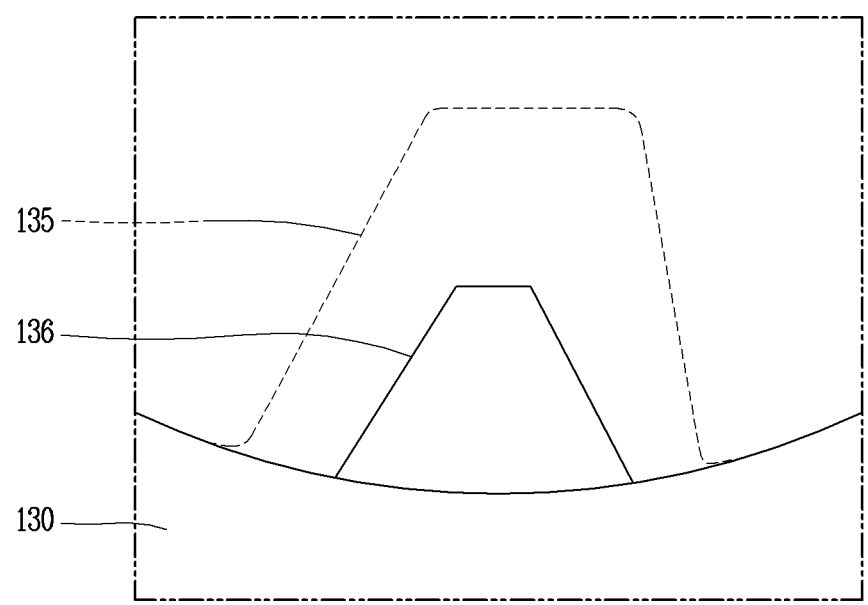
FIG. 5 is a conceptual view comparing a bent portion according to the present disclosure with a typical lifter.

Referring to FIG. 5, the lifter 135 in the related art is compared with the bent portion 136 according to the present disclosure.

As illustrated in FIG. 5, a height of the bent portion 136 may be formed smaller than that of the lifter 135 in the related art. In other words, the height of the bent portion 136 may be formed lower than a predetermined height value.

In addition, a width of the bent portion 136 may be formed narrower than that of the lifter 135 in the related art.

In one example, the height of the bent portion 136 may be set to the same size as the width of the bent portion 136.

In another example, the bent portion 136 may be formed in a triangular shape.

Moreover, the bent portion 136 may be integrally formed with the drum 130.

In other words, unlike the lifter 135 in the related art, since the bent portion 136 is included as a part of the drum 130, no separate fastening member is required during the process of forming the bent portion 136.

Moreover, the bent portion 136 is formed by an external pressure applied to an outer circumferential surface of the drum 130 and thus, it is not required to drill an additional hole in the drum 130 during the process of forming the bent portion 136.

Furthermore, since the bent portion 136 is formed integrally with the drum 130, the manufacturing cost of the drum 130 does not increase even if the number of the bent portions 136 increases.

Various embodiments of the drum 130 according to the present disclosure will be described below with reference to FIGS. 6A through 6E.

Figure 6A:
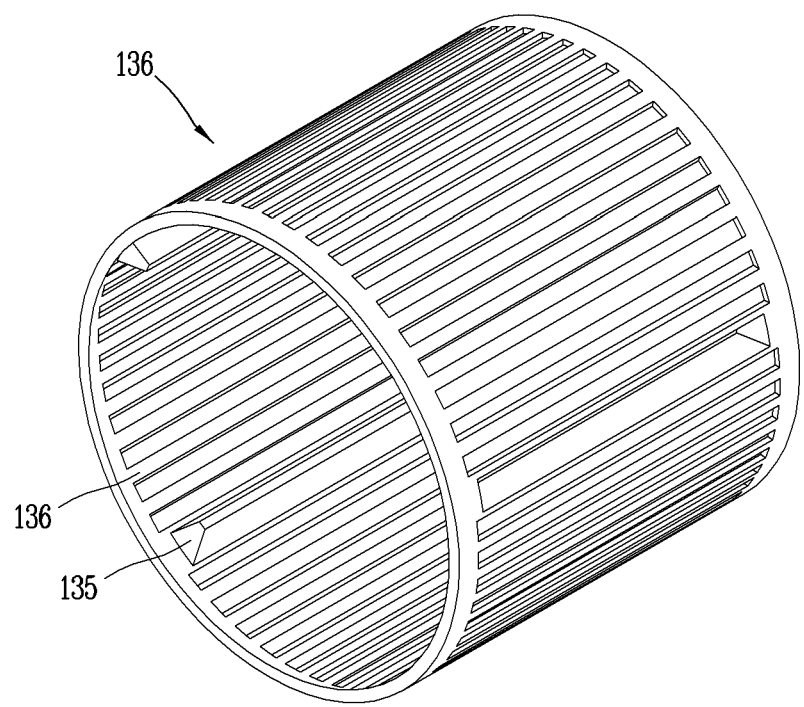
FIGS. 6A through 6E are conceptual views showing embodiments related to a bent portion of the present disclosure.
Figure 6B:
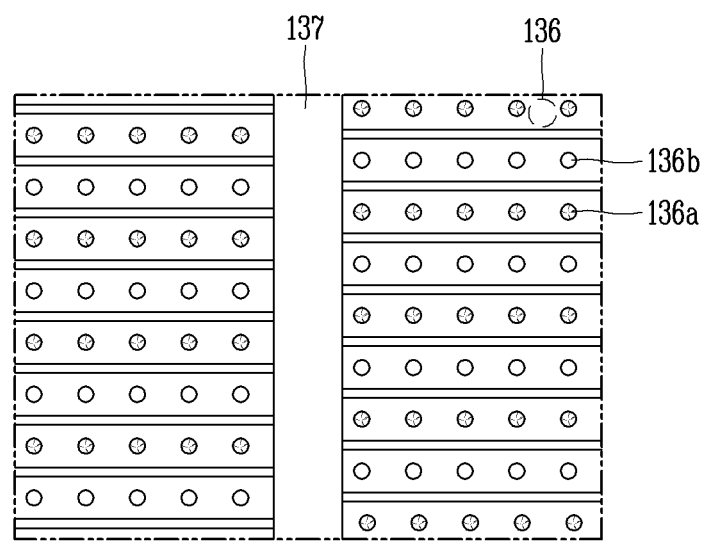

Referring to FIG. 6B, the bent portion 136 may include a first bent portion formed on an inner circumferential surface of the entrance side of the drum, and a second bent portion formed on an inner circumferential surface of the bottom portion side of the drum.

Specifically, the first bent portion and the second bent portion may be arranged in a shape of intersecting with each other. The first bent portion and the second bent portion may be spaced apart by a predetermined length.

Referring to FIG. 6B, an inner circumferential surface of the drum is divided into two regions by an imaginary line 137, and a first bent portion and a second bent portion may be formed in the divided regions, respectively.

In addition, a plurality of protrusions 136a may be formed at regular intervals on a surface of the bent portion 136. In other words, a plurality of protrusions 136a may be formed on a convex portion formed by the bent portion 136. The protrusions 136a may maximize a physical force applied to laundry by the drum 130.

Furthermore, between different bent portions 136, a plurality of through holes 136b may be formed to allow wash water to flow in and out. In other words, a plurality of through hole portions 136a may be formed on a concave portion formed by the bent portion 136.

On the other hand, though not illustrated in FIG. 6B, the inner circumferential surface of the drum 130 may be divided into more regions than the two regions, and different bent portions may be formed for each of the divided regions.

In other words, the inner circumferential surface of the drum is divided into a plurality of regions, and a plurality of bent portions may be formed in each of the divided regions. At this time, it suffices that the plurality of bent portions are arranged so as to intersect the bent portions in proximity with each other.

Figure 6C:
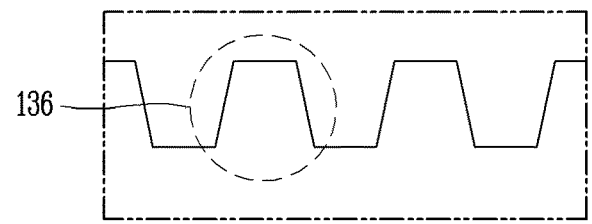
Figure 6D:
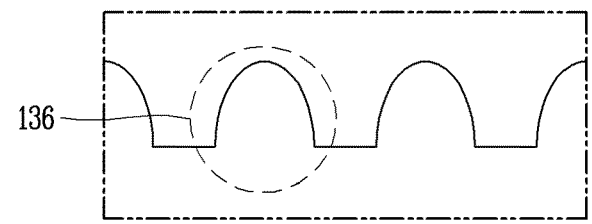

Referring to FIGS. 6C and 6D, the bent portion 136 may have a tapered shape toward the inside of the drum.

Specifically, the bent portion 136 may have a trapezoidal shape, as illustrated in FIG. 6C.

Furthermore, as illustrated in FIG. 6D, the bent portion 136 is configured to have a predetermined height, and an upper end portion of the bent portion 136 may be formed to have a circular shape having a predetermined curvature.

On the other hand, though not illustrated in FIGS. 6C and 6D, the bent portion 136 may have at least one of a triangular shape, a trapezoidal shape, and a circular shape. In other words, the bent portion 136 may be configured to have a plurality of shapes.

Since the bent portion 136 may be formed to be recessed from an outer surface of the drum 130 toward an inside of the drum 130, the bent portion 136 may be recessed to have a plurality of shapes.

Figure 6E:
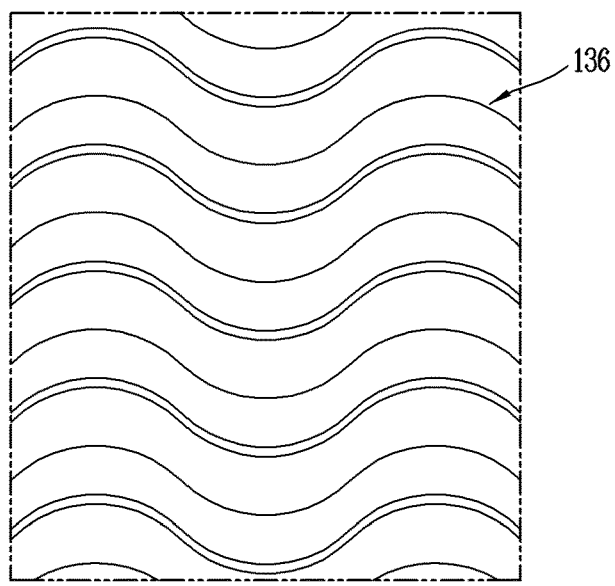

Referring to FIG. 6E, each of the bent portions 136 may be formed to have a predetermined curvature toward the bottom portion side from the entrance side of the drum.

In other words, an imaginary line formed by each of the bent portions 136 from the entrance side of the drum to the bottom portion side thereof may be a straight line or a curved line.

Meanwhile, though not illustrated in FIGS. 6A through 6E, each of the bent portions 136 may be formed to have a lower height toward the entrance side of the drum 130. Furthermore, each of the bent portions 136 may be formed to have a lower height toward the bottom portion side of the drum 130.

In other words, a height of each bent portion 136 is the highest at the center point between the entrance and the bottom portion of the drum, and may be formed to have a lower height toward the entrance side and the bottom portion side.

FIGS. 7A through 7G are views showing drum driving motions that can be implemented by a laundry treating apparatus according to an embodiment of the present disclosure. Hereinafter, drum driving motions will be described in detail with reference to FIGS. 7A through 7G.

The drum driving motion denotes a combination of the rotational direction and the rotational speed of the drum 130, and the falling direction or falling time of laundry located inside the drum 130 is varied by the drum driving motion, and as a result, the flow of laundry inside the drum 130 is varied. The drum driving motion is implemented by controlling a motor that rotates the drum by the controller.

The laundry may be lifted by the bent portion 136 provided on an inner circumferential surface of the drum 130 during the rotation of the drum 130, thereby varying a shock applied to the laundry by controlling the rotational speed and the rotational direction of the drum 130. In other words, a mechanical force such as friction between laundries, friction between laundry and wash water, and a falling impact of laundry may be varied. In other words, a degree of pounding or rubbing laundry for washing may be varied, and a degree of spreading or overturning laundry may be varied.

Meanwhile, in order to implement such various drum driving motions, a motor for rotating the drum is preferably a direct drive type motor. In other words, it is preferable that a stator of the motor is fixed to a rear side of the tub 120, and a drive shaft rotated together with a rotor of the motor directly drives the drum 130 It is because, by controlling the rotational direction and torque of the motor, time delay or backlash can be prevented as much as possible to immediately control a drum driving motion.

On the contrary, in the form of transmitting a rotational force of the motor to a rotation shaft through a pulley or the like, a drum driving motion in the form of allowing time delay or backlash, for example, tumbling driving or spinning driving is possible, but it is inadequate to implement the other various drum driving motions. The driving method of the motor and the drum 130 are obvious to those skilled in the art, and thus the detailed description thereof will be omitted.

Figure 7A:
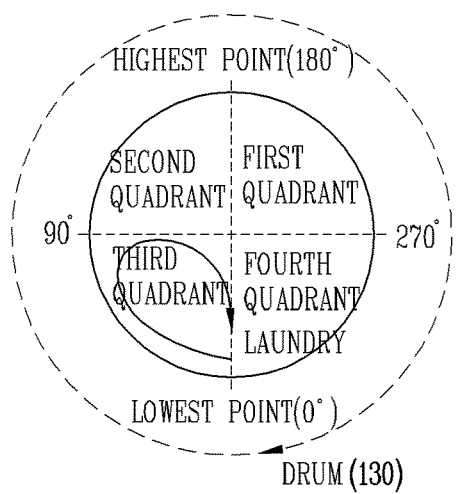
FIGS. 7A through 7G are conceptual views showing a drum driving motion carried out in a laundry treating apparatus having a typical lifter.

FIG. 7A is a view showing a rolling motion. The rolling motion is a motion in which laundry on an inner circumferential surface of the drum 130 falls toward the lowest point of the drum 130 at a position less than about 90 degrees in a rotational direction of the drum 130 while the motor rotates the drum 130 in one direction (preferably, one or more revolutions).

For example, when the motor rotates the drum 130 at about 40 RPM, laundry located at the lowest point of the drum 130 rises a predetermined height along the rotational direction of the drum 130, and then flows toward the lowest point of the drum 130 as it rolls at a position less than about 90 degrees. When the drum 130 rotates in the clockwise direction, it is visually seen that the laundry is continuously rolled in the third quadrant of the drum 130.

During the rolling motion, the laundry is washed through friction with wash water, friction between the laundries, and friction with an inner circumferential surface of the drum 130. At this time, the overturning of the laundry may be sufficiently generated, thereby obtaining the effect of smoothly rubbing and washing the laundry.

Here, a rotational speed (rpm) of the drum 130 is determined in relation to a radius of the drum 130. In other words, as the rotational speed of the drum 130 increases, a centrifugal force acting on the laundry in the drum 130 also increases. The flow of the laundry inside the drum 130 varies due to a difference in magnitude between the centrifugal force and the gravitational force. Of course, a rotational force of the drum 130 and a frictional force between the drum 130 and the laundry must also be considered. Accordingly, in consideration of various forces acting on the laundry, the rotational speed of the drum 130 in the rolling motion is determined in a range where the sum of the centrifugal force and the frictional force is smaller than the gravitational force (1G).

Figure 7B:
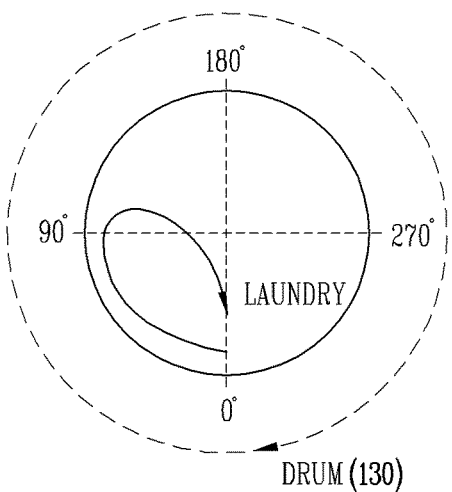

FIG. 7B is a view showing a tumbling motion. The tumbling motion is a motion in which laundry on an inner circumferential surface of the drum 130 falls to the lowest point of the drum 130 at a position between 90 and 110 degrees in a rotational direction of the drum 130 while the motor rotates the drum 130 in one direction (preferably, one or more revolutions). The tumbling motion is a drum driving motion typically used in washing and rinsing since a mechanical force is generated only by controlling the drum 130 to rotate in one direction at an appropriate rotational speed.

In other words, the laundry loaded in the drum 130 is located at the lowest point of the drum 130 prior to driving the motor. The drum 130 rotates when the motor provides a torque to the drum 130, and the laundry is lifted to a predetermined height from the lowest point in the drum 130 by a frictional force between the bent portion 136 provided on an inner circumferential surface of the drum 130 or an inner circumferential surface of the drum 130. For example, when the motor rotates the drum 130 by about 46 rpm, the laundry falls from the lowest point of the drum 130 toward the lowest point of the drum 130 at a position between 90 and 110 degrees in a rotational direction.

The rotational speed of the drum 130 in the tumbling motion may be set in a range where the centrifugal force is generated larger than in the case of the rolling motion but less than in gravity.

Visually, the tumbling motion is carried out such that when the drum 130 rotates in a clockwise direction, the laundry is lifted from the lowest point of the drum 130 to a position of 90 degrees or the second quadrant, and then separated into an inner circumferential surface of the drum 130 to fall toward the lowest point of the drum 130.

Therefore, during the tumbling motion, the laundry is washed by an impact force caused by the friction and falling of wash water, and in particular, washed by a greater mechanical force than in the case of the rolling motion. In particular, there is an effect that the laundry tangled during the tumbling motion is separated and spread.

Figure 7C:
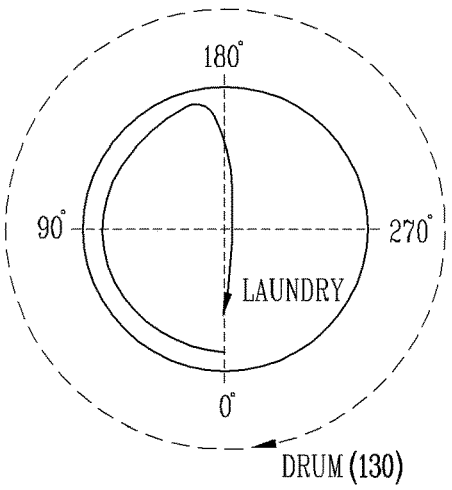

FIG. 7C is a view showing a step motion. The step motion is a motion in which laundry on an inner circumferential surface of the drum 130 falls toward the lowest point of the drum 130 at the highest point of the drum 130 (a position of about 180 degrees in a rotational direction of the drum 130) while the motor rotates the drum 130 in one direction (preferably, less than one revolution).

In other words, the step motion is a motion in which the drum 130 is rotated at a speed at which laundry is not performed at a speed at which the laundry does not fall from an inner circumferential surface of the drum 130 due to centrifugal force (that is, a speed at which the laundry is rotated together with the drum 130 in a state in which the laundry is stuck to the inner circumferential surface of the drum 130 due to the centrifugal force), and then the drum 130 is rapidly braked, thereby maximizing an impact force on the laundry.

For example, when the motor rotates the drum 130 at a speed of about 60 rpm or more, the laundry may be rotated by the centrifugal force without falling (that is, rotated together with the drum 130 while being stuck to the inner circumferential surface of the drum 130), and during this process, when the laundry is located near the highest point (180 degrees in the rotating direction) of the drum 130, a torque in a direction opposite to the rotational direction of the drum 130 may be controlled to be applied to the motor.

The laundry 130 rises from the lowest point of the drum 130 along the rotational direction of the drum 130 and then falls to the lowest point from the highest point of the drum 130 while the drum 130 stops, and thus a drop difference of the laundry is maximized, and therefore, an impact force acting on the laundry is also maximized. A mechanical force (for example, impact force) generated by such a step motion is larger than the above-described rolling motion or tumbling motion.

Visually, the step motion is carried out such that when the drum 130 rotates in a clockwise direction, the laundry located at the lowest point of the drum 130 moves to the highest point (180 degrees) of the drum 130 through the third quadrant and the second quadrant, and then abruptly is separated from the inner circumferential surface of the drum 130 to fall toward the lowest point of the drum 130. Therefore, the step motion provides a mechanical force more effectively as the drop difference of the laundry is the largest and the amount of laundry is smaller.

On the other hand, as a control method of the motor for braking the drum 130, reverse phase braking is preferable. The reverse phase braking is a method of braking by generating a rotational force in a direction opposite to a direction in which the motor is rotating. A phase of power supplied to the motor may be reversed in order to induce a rotational force in a direction opposite to a direction in which the motor is rotating, thereby allowing rapid braking in such a manner. Therefore, the reverse phase braking is suitable for a step motion.

After the motor is braked, the motor applies a torque again to the drum 130 to lift the laundry at the lowest point of the drum 130 to the highest point. In other words, a step motion is implemented by applying a torque to rotate in a forward direction, then applying a torque to rotate instantaneously in a reverse direction to make a sudden stop, and then applying a torque to rotate in a forward direction again.

The step motion may be a motion in which wash water introduced through the through holes formed in the drum 130 and laundry are rubbed and washed, and when the laundry is located at the highest point of the drum 130, the laundry is dropped and washed by an impact force.

Figure 7D:
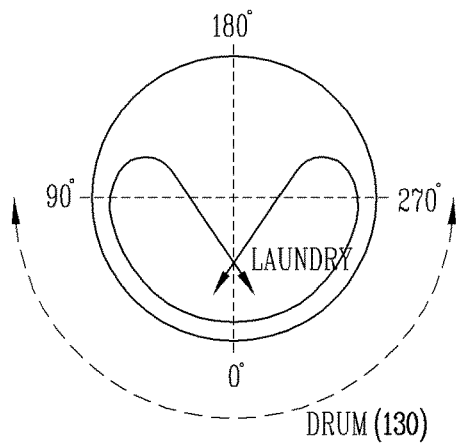

FIG. 7D is a view showing a swing motion. The swing motion is a motion in which the motor rotates the drum 130 in both directions, and the laundry is dropped at a position less than about 90 degrees in a rotational direction of the drum 130. For example, when the motor rotates the drum 130 in a counterclockwise direction at about 40 rpm, the laundry located at the lowest point of the drum 130 is lifted in a counterclockwise direction by a predetermined height. At this time, the motor stops the rotation of the drum 130 before the laundry reaches the position of about 90 degrees in a counterclockwise direction, and accordingly, the laundry is moved in a counterclockwise direction toward the lowest point of the drum 130 at a position of less than about 90 degrees.

After the rotation of the drum 130 is stopped, the motor rotates the drum 130 in a clockwise direction at about 40 rpm so that the laundry is lifted up to a predetermined height along the rotational direction (i.e., clockwise direction) of the drum 130. Furthermore, the motor is controlled such that the rotation of the drum 130 is stopped before the laundry reaches the position of about 90 degrees in a clockwise direction, and thus the laundry falls toward the lowest point of the drum 130 at a position less than about 90 degrees in a clockwise direction.

In other words, the swing motion is a motion in which the forward rotation/stop and reverse rotation/stop of the drum 130 are repeated, and visually carried out such that an operation in which the laundry located at the lowest point of the drum 130 passes through the third quadrant of the drum 130 and rises up to the second quadrant, and then smoothly falls, and again passes through the fourth quadrant of the drum 130 and rises up to the first quadrant, and then smoothly falls is repeated. In other words, the swing motion is visually carried out such that the laundry flows in an eight-letter form lying down over the third quadrant and the fourth quadrant of the drum 130.

At this time, power generation braking is suitable for the braking of the motor. The power generation braking minimizes a load on the motor and minimizes the mechanical wear of the motor while at the same making it possible to control an impact applied to the laundry.

The power generation braking is a braking method that uses a motor performing the role of a generator due to rotational inertia when current applied to the motor is turned off. When current applied to the motor is turned off, the direction of the current flowing through the coil of the motor is opposite to the direction of the current prior to turning off power, and thus a force (Fleming's right hand rule) acts in a direction impeding the rotation of the motor to brake the motor. Unlike reverse phase braking, the power generation braking does not rapidly brake the motor, but smoothly changes the rotational direction of the drum 130.

Figure 7E:
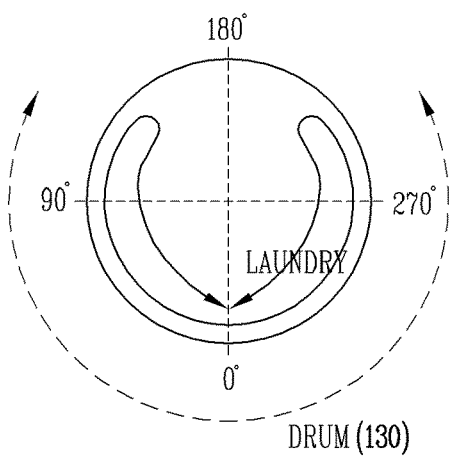

FIG. 7E is a view showing a scrub motion. The scrub motion is a motion in which the motor alternately rotates the drum 130 in both directions, and the laundry is dropped at a position above about 90 degrees in a rotational direction of the drum 130.

For example, when the motor rotates the drum 130 in a forward direction at about 60 rpm or more, the laundry located at the lowest point of the drum 130 is lifted in a forward direction by a predetermined height. At this time, the motor provides a reverse torque to the drum 130 after the laundry has passed through a position of about 90 degrees in the forward direction to temporarily stop the rotation of the drum 130. Then, the laundry on an inner circumferential surface of the drum 130 rapidly falls.

Thereafter, the motor rotates the drum 130 in a reverse direction at about 60 rpm or more, and lifts the fallen laundry back up to a predetermined height of 90 degrees or more in the reverse direction. When the laundry passes the 90 degree position in the reverse direction, the motor again provides a reverse torque to the drum 130 to temporarily stop the rotation of the drum 130. At this time, the laundry on the inner circumferential surface of the drum 130 falls toward the lowest point of the drum 130 at a position of 90 degrees or more in the reverse direction.

The scrub motion causes the laundry to fall rapidly at a predetermined height to wash the laundry. At this time, the motor preferably performs reverse phase braking for the braking of the drum 130.

Since the rotational direction of the drum 130 is rapidly switched, the laundry does not deviate greatly from the inner circumferential surface of the drum 130, thereby obtaining an effect of very strongly rubbing and washing.

The scrub motion is carried out such that an operation in which the laundry that has passed through the third quadrant in a forward direction and has moved to the second quadrant rapidly falls and then moves back to part of the first quadrant through the fourth quadrant in a reverse direction and then drops is repeated. Accordingly, the scrub motion is visually carried out such that an operation in which the laundry rises and then falls along the inner circumferential surface of the drum 130 is repeated.

Figure 7F:
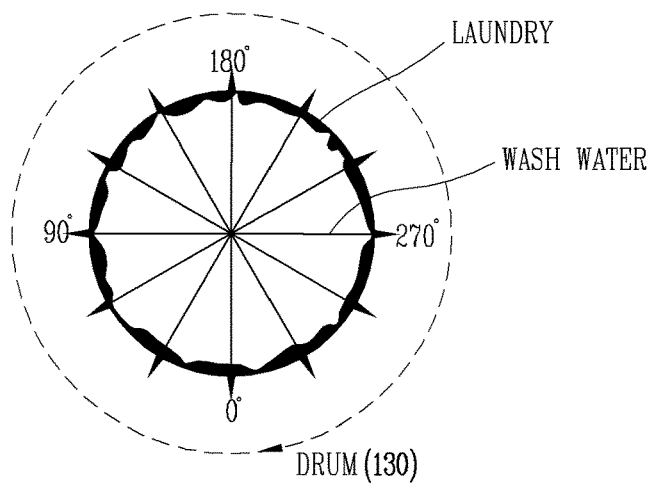

FIG. 7F is a view showing a filtration motion. The filtration motion is a motion in which the motor rotates the drum 130 not to allow the laundry to fall from the inner circumferential surface of the drum 130 by the centrifugal force, and during the process, wash water is injected into the drum 130 through a nozzle (not shown).

Since wash water is injected into the drum 130 while the laundry is in close contact with the inner circumferential surface of the drum 130 subsequent to unfolding the laundry, the injected wash water passes through the laundry by the centrifugal force, and then flows out to the tub 120.

The filtration motion broadens a surface area of the laundry while wash water passes through the laundry, thereby obtaining an effect of uniformly wetting the laundry.

Figure 7G:
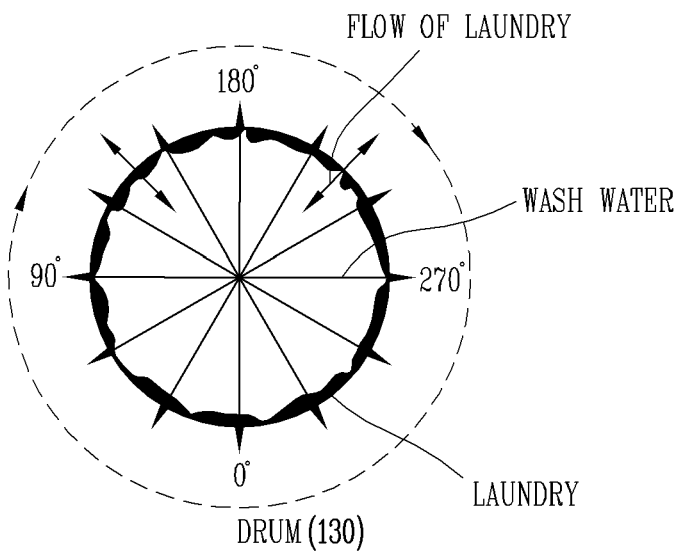

FIG. 7G is a view showing a squeeze motion. The squeeze motion is a motion in which an operation in which the motor rotates the drum 130 not to allow the laundry to fall from the inner circumferential surface of the drum 130 due to centrifugal force and then decreases the rotational speed of the drum 130 to separate the laundry from the inner circumferential surface of the drum 130 is repeated, and wash water is injected into the drum 130 through the nozzle during the rotation of the drum 130.

The filtration motion continues to rotate at a speed at which the laundry does not fall from the inner circumferential surface of the drum 130, but the squeeze motion has a difference in that allowing the laundry to be in close contact with and separated from the inner circumferential surface of the drum 130 is repeated by changing the rotational speed of the drum 130.

The step motion and the scrub motion are motions suitable for a case where the laundry is severely contaminated with dirt and a washing course for reducing washing time through excellent cleaning power. In addition, the step motion and the scrub motion are motions with high levels of vibration and noise. Therefore, it is an undesirable motion for a case where the laundry is sensitive clothes or a washing course required to minimize noise and vibration.

The rolling motion is a motion characterized by excellent cleaning power, low vibration level, minimal damage to laundry and low motor load. Therefore, it may be applicable to all washing courses, but particularly suitable for detergent dissolving and laundry wetting during the initial stage of washing. However, the rolling motion has a disadvantage that washing time is longer when washing is performed to the same level as that of tumbling motion, instead of low vibration level.

The tumbling motion has a lower cleaning force than the scrub motion, but has an intermediate vibration level between the scrub motion and the rolling motion. The tumbling motion is applicable to all washing courses, but particularly useful for the step of bubble dispersion.

The squeeze motion has a cleaning force similar to the tumbling motion, and has a higher vibration level than the tumbling motion. The squeeze motion is useful for the step of rinsing since wash water is discharged to the outside of the drum 130 through the laundry during the process of repeatedly allowing the laundry to be in close contact with and separated from the inner circumferential surface of the drum 130.

The filtration motion has a lower cleaning force than the squeeze motion, and has a noise level similar to the rolling motion. The filtration motion is a motion in which wash water passes through the laundry in close contact with the inner circumferential surface of the drum 130, and is discharged to the tub 120, and thus it is a useful motion when wetting the laundry or adding detergent water to the laundry in the early stage of washing.

The swing motion is a motion with the lowest vibration level and cleaning power. Accordingly, the swing motions is a motion suitable for low noise or low vibration washing courses, and a motion suitable for sensitive gentle care.

On the other hand, a plurality of drum driving motions described above correspond to a laundry treating apparatus including the drum 130 having the lifter 135 in the related art.

However, even in the laundry treating apparatus including the drum 130 having the bent portion 136 proposed by the present disclosure, the drum driving motions illustrated in FIGS. 7A through 7G may still be effectively applicable.

Hereinafter, a new drum driving motion optimized for a laundry treating apparatus having the bent portion 136 in the present disclosure will be described.

Figure 8:
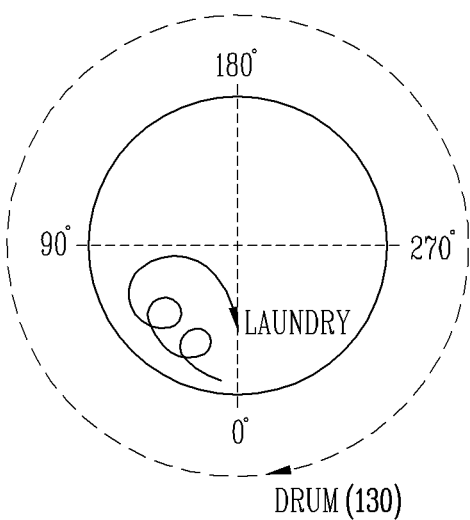
FIG. 8 is a conceptual view showing a drum driving motion carried out in a laundry treating apparatus according to the present disclosure.

FIG. 8 is a view showing a washboard motion proposed by the present disclosure.

The washboard motion is a motion in which laundry on an inner circumferential surface of the drum 130 falls to the lowest point of the drum 130 at a position between 60 and 90 degrees in a rotational direction of the drum 130 while the motor rotates the drum 130 in one direction.

In order to implement the washboard motion, the controller of the laundry treating apparatus according to the present disclosure may control the rotation of the motor to receive a physical force greater than a still frictional force applied between the laundry and the drum from the inner circumferential surface of the drum during the process of allowing the laundry in the drum to fall to be in contact with part of the drum 130.

Specifically, when the washboard motion is started, the controller may increase the rotational speed of the motor at a first acceleration for a first time interval and decrease the rotational speed of the motor at a second acceleration for a second time interval.

At this time, the controller may set an absolute value of the first acceleration to be smaller than that of the second acceleration. In other words, a period of time required to reduce the rotational speed of the drum 130 by a predetermined value may be set to be smaller than that required to increase the rotational speed of the drum 130 by the same value.

For reference, the motor may be in a stopped state at a time point when the controller starts to increase the rotation speed of the motor to the first acceleration and at a time point when the process of decreasing the rotation speed to the second acceleration is completed.

In this manner, when controlling a rotation pattern of the drum, the drum 130 applies a force greater than a static frictional force acting between the drum and the laundry at a time point when the laundry falls to be in contact with a portion of the drum 130.

In other words, during the process of allowing the laundry to be in contact with the inner circumferential surface of the drum 130, the inner circumferential surface of the drum 130 may move independently of the laundry while applying a strong force to part of the laundry.

As described above, the inner circumferential surface of the drum 130 is provided with a plurality of bent portions 136 to be similar to the shape of the washboard, and thus when the drum 130 is separately rotated by the rotation pattern of the drum 130 while applying a physical force above a still frictional force, a principle of rubbing and washing the laundry on the washboard is implemented.

On the other hand, the laundry is not formed of a single rigid body but its shape can be changed by a force externally applied thereto, a physical force applied from the drum 130 may be continuously changed.

If the drum 130 continuously applies a force greater than a static frictional force to the laundry, the laundry will theoretically not rise along the rotational direction of the drum 130.

However, in consideration of the physical characteristics of the laundry as described above, when the drum 130 rotates according to the washboard motion, the drum 130 rotates along with the laundry, and rotates separately from the laundry.

In other words, when the controller controls the rotation pattern of the drum 130 according to the washboard motion, the drum 130 applies a physical force above or below a static frictional force to the laundry.

Accordingly, the laundry may be lifted in the rotational direction of the drum 130, and the controller may control the lifted laundry to be separated from the drum 130 at a predetermined angular position with respect to the rotational direction of the drum 130 so as to fall to the lowest point of the drum 130.

Referring again to FIG. 8, the laundry lifted through the foregoing process rotates by itself during the process of being lifted along the rotational direction of the drum 130.

Figure 9:
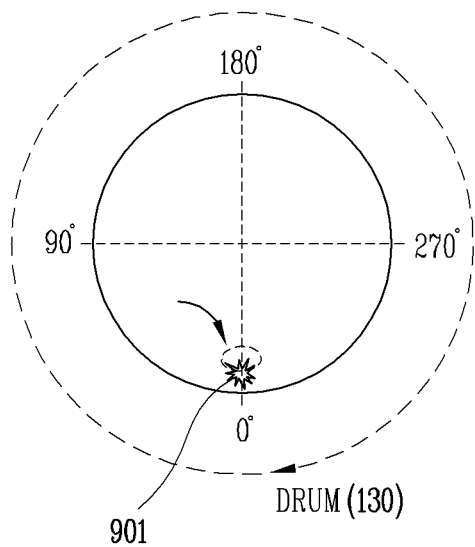
FIG. 9 is a conceptual view showing a drum driving motion carried out in a laundry treating apparatus according to the present disclosure.

Referring to FIG. 9, the controller may increase the rotational speed of the motor from a time point when the laundry falls to be in contact with a portion 901 of the drum 130 in order to increase a physical force received at the laundry from the inner circumferential surface of the drum 130.

At this time, the portion 901 of the drum 130 may be the lowest point of the drum.

In other words, when the laundry is in contact with the lowest point of the drum 130, the controller may increase the rotational speed of the motor to the first acceleration, thereby generating a torque on the drum 130.

Figure 10:
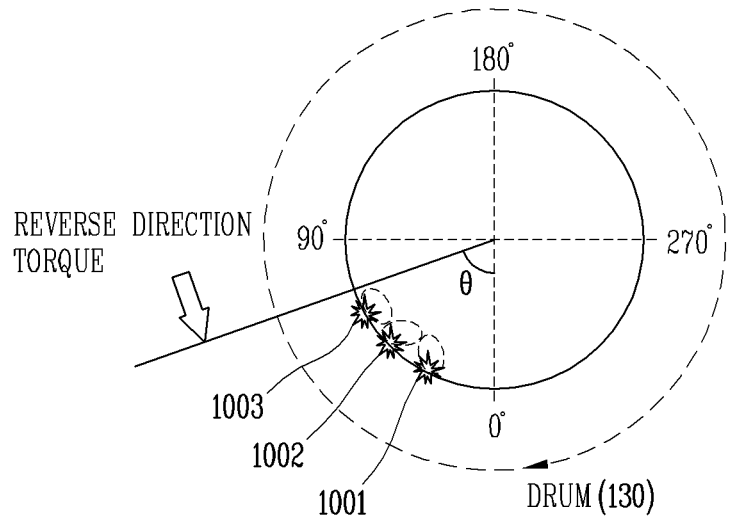
FIG. 10 is a conceptual view showing a drum driving motion carried out in a laundry treating apparatus according to the present disclosure.

Referring to FIG. 10, the controller may control the motor such that the laundry is separated from the drum at a predetermined angular position with respect to the rotational direction of the drum to fall to the lowest point of the drum.

Specifically, when the laundry reaches a predetermined angular position in the drum 130, the controller may control the motor such that a torque acting in a direction opposite to the advancing direction of the laundry is applied to the drum 130.

For example, when the laundry reaches a predetermined angular position in the drum 130, the controller may perform reverse phase braking on the motor.

In another example, the predetermined angular position may be a 60 degree position. However, the controller may change the predetermined angular position according to the weight of the laundry. For example, when it is determined that the weight of the laundry is above a reference weight, the controller may change the predetermined angular position to a 90 degree position.

On the other hand, referring to FIG. 10, when the laundry moves from the lowest point 901 of the drum 130 to a predetermined angular position, the controller controls the motor to receive a physical force greater than a still frictional force acting between the drum 130 and the laundry from the inner circumferential surface of the drum a plural number of times 1001, 1002, 1003.

Figure 11:
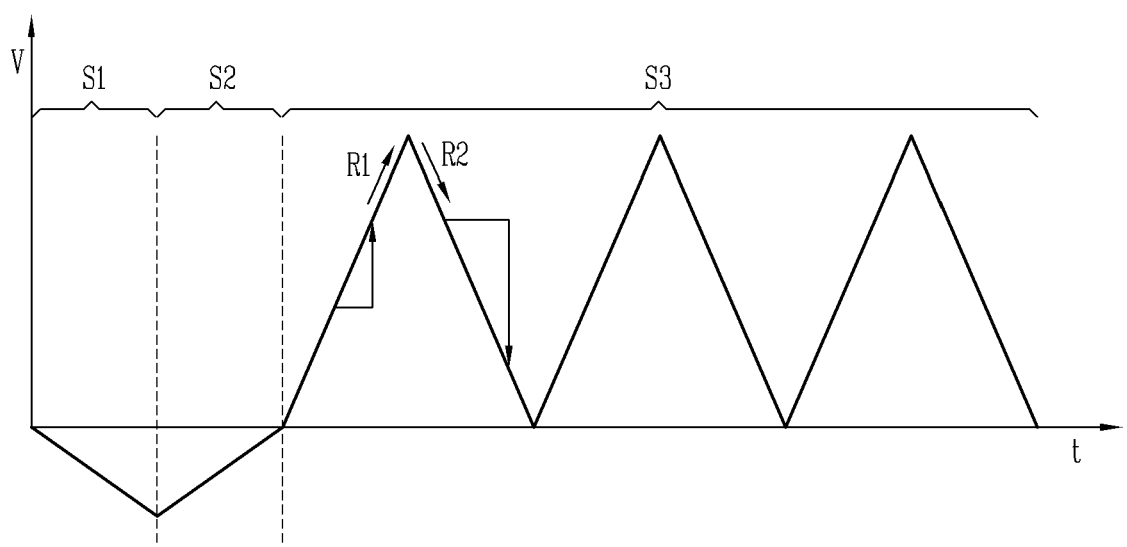
FIG. 11 is a graph showing a rotational speed of a motor when a drum driving motion proposed in the present disclosure is carried out.

FIG. 11 is a graph showing a speed of the motor performing the washboard motion.

Referring to FIG. 11, the controller may control the motor to apply a reverse torque to the advancing direction of the drum 130 in a first section (S1) when a washboard motion is selected, and perform reverse phase braking to the reverse torque in a second section (S2), and control the motor according to the rotation pattern of the motor corresponding to the washboard motion in the third section S3.

As illustrated in FIG. 11, the controller may increase the rotational speed of the motor at a first acceleration (R1) for a first time interval, and decrease the rotational speed of the motor at a second acceleration (R2) for a second time interval.

As described above, an absolute value of the first acceleration (R1) may be set to be smaller than that of the second acceleration (R2).

In addition, since the rotational speed of the motor is zero at a time point when the controller completes the process of decreasing the rotational speed of the motor to the second acceleration (R2), the motor may be in a stopped state.

The laundry treating apparatus according to the present disclosure may perform a drum driving motion optimized for a drum including a bent portion and a shape of the drum, thereby implementing a principle of rubbing and washing laundry on a washboard.

Furthermore, a mechanical force received by laundry may be maximized by a shape of a drum included in the clothes processing apparatus according to the present invention and a drum driving motion optimized for the shape, thereby enhancing the washing performance.

In addition, according to the laundry treating apparatus of the present disclosure, a physical force acting between laundry and a drum in the drum may be maximized, thereby enhancing the cleaning power.

Besides, according to the laundry treating apparatus of the present disclosure, a bent portion integrally formed with a drum, thereby preventing a failure, which may be caused by a fastening structure of the drum and the lifter, in advance.

It should be understood by those skilled in the art that the present disclosure can be embodied in other specific forms without departing from the concept and essential characteristics thereof. The detailed description is, therefore, not to be construed as illustrative in all respects but considered as restrictive. The scope of the invention should be determined by reasonable interpretation of the appended claims and all changes that come within the equivalent scope of the invention are included in the scope of the invention.

What is claimed is:

1. A laundry treating apparatus, comprising:
    a cabinet;
    a tub located inside of the cabinet;
    a drum that is located inside of the tub, that is configured to rotate, and that is configured to accommodate laundry;
    a motor connected to a rotation shaft of the drum; and
    a controller configured to control the motor based on any one of a plurality of drum driving motions,
    wherein the drum comprises:
        a plurality of bent portions protruding from an inner circumferential surface of the drum and extending along an axial direction of the drum, and
        a plurality of lifters protruding from the inner circumferential surface of the drum and extending along an axial direction of the drum, wherein a height of the lifters is greater than a height of the bent portions,
    wherein, based on a first motion of the plurality of drum driving motions being selected and started, the controller is configured to:
        increase, until the laundry reaches a predetermined angular position under 90 degrees, a rotational speed of the motor in a first direction at an acceleration to increase a shock between the laundry and the plurality of bent portions, the first direction being a laundry advancing direction, decrease, based on the laundry reaching the predetermined angular position, the rotational speed of the motor to zero revolutions per minute (RPM) at a deceleration to decrease the shock between the laundry and the plurality of bent portions, and increase, based on the laundry falling to a lowest portion of the drum after the deceleration, the rotational speed of the motor in the first direction to increase the shock between the laundry and the plurality of bent portions.

2. The laundry treating apparatus of claim 1, wherein the controller is further configured to set an absolute value of the acceleration less than an absolute value of the deceleration.

3. The laundry treating apparatus of claim 1, wherein the controller is further configured to repeat increasing and decreasing the rotational speed of the motor a predetermined number of times.

4. The laundry treating apparatus of claim 3, wherein the controller is further configured to stop driving the motor for a preset time interval after repeating the increasing and decreasing the rotational speed of the motor for the predetermined number of times.

5. The laundry treating apparatus of claim 3, wherein the motor is configured to maintain a stopped state based on completion of decreasing the rotational speed of the motor at the deceleration.

6. The laundry treating apparatus of claim 1, wherein the controller is configured to determine a weight of laundry in the drum, and wherein the controller is further configured to change a driving pattern of the motor corresponding to the first motion based on the weight of laundry.

7. The laundry treating apparatus of claim 6, wherein the controller is further configured to, based on the weight of laundry, change at least one of the acceleration or the deceleration.

8. The laundry treating apparatus of claim 1, wherein the controller is further configured to perform reverse phase braking of the motor to decrease the rotational speed of the motor by generating rotational force in a direction opposite to a rotational direction of the motor.

9. The laundry treating apparatus of claim 1, wherein the controller is further configured to control the motor to cause laundry (i) to be separated from the drum at the predetermined angular position with respect to a rotational direction of the drum and (ii) to fall toward the lowest portion of the drum.

10. The laundry treating apparatus of claim 1, wherein the controller is further configured to, based on the laundry reaching the predetermined angular position in the first direction, control the motor to apply torque to the drum in a second direction opposite to the first direction.

11. The laundry treating apparatus of claim 1, wherein the controller is further configured to control the motor to increase the shock between the plurality of bent portions and the laundry for a plurality of times based on the laundry moving from the lowest portion of the drum to the predetermined angular position.

12. The laundry treating apparatus of claim 1, wherein each of the plurality of bent portions is arranged at regular intervals along the inner surface of the drum.

13. The laundry treating apparatus of claim 12, wherein each of the plurality of bent portions is integrally formed with the drum and extend from an entrance side of the drum to a rear side of the drum.

14. The laundry treating apparatus of claim 12, wherein the plurality of bent portions comprise:

a first bent portion located at a first portion of the inner surface at an entrance side of the drum; and a second bent portion located at a second portion of the inner surface at a rear side of the drum opposite to the entrance side and spaced apart from the first bent portion in a direction toward the rear side of the drum.

15. The laundry treating apparatus of claim 14, wherein the first bent portion and the second bent portion extend along different imaginary lines that extend from the entrance side toward the rear side, and wherein the first bent portion and the second bent portion are offset from each other along the inner surface of the drum.

16. The laundry treating apparatus of claim 12, wherein each of the plurality of bent portions has a predetermined curvature from an entrance side of the drum toward a rear side of the drum.

17. The laundry treating apparatus of claim 12, wherein each of the plurality of bent portions comprises a plurality of protrusions that are located at a surface of each of the plurality of bent portions and that are arranged at regular intervals.

18. The laundry treating apparatus of claim 12, wherein each of the plurality of bent portions has a tapered shape that extends toward an inside of the drum.

* * * * *